United States Patent [19]
Bertin et al.

[11] Patent Number: 5,600,638
[45] Date of Patent: *Feb. 4, 1997

[54] METHOD AND SYSTEM FOR IMPROVING THE PROCESSING TIME OF THE PATH SELECTION IN A HIGH SPEED PACKET SWITCHING NETWORK

[75] Inventors: Olivier Bertin, Nice; Olivier Maurel, Le Cannet, both of France

[73] Assignee: International Business Machines Corporation, Armonk, N.Y.

[ * ] Notice: The term of this patent shall not extend beyond the expiration date of Pat. No. 5,233,604.

[21] Appl. No.: 354,407

[22] Filed: Dec. 12, 1994

[30] Foreign Application Priority Data

Aug. 3, 1994 [EP] European Pat. Off. .............. 93480231

[51] Int. Cl.$^6$ ........................... H04L 12/56; H04Q 11/04
[52] U.S. Cl. ........................... 370/351; 370/400; 370/255
[58] Field of Search ........................ 370/54, 58.2, 58.3, 370/60, 94.3, 94.1; 379/220, 221

[56] References Cited

U.S. PATENT DOCUMENTS

| | | | |
|---|---|---|---|
| 4,905,233 | 2/1990 | Cain et al. | 370/94.1 |
| 5,142,531 | 8/1992 | Kirby | 370/94.3 |
| 5,233,604 | 8/1993 | Ahmadi et al. | 370/60 |
| 5,317,566 | 5/1994 | Joshi | 370/60 |
| 5,347,511 | 9/1994 | Gun | 370/54 |

FOREIGN PATENT DOCUMENTS 0568477  3/1993  European Pat. Off. ........ H04L 12/56

OTHER PUBLICATIONS

"An International Journal", Computers and Electrical Engineering, vol. 10, 1983, List of Contents and Author Index 9 pages.

*Primary Examiner*—Douglas W. Olms
*Assistant Examiner*—Russell W. Blum
*Attorney, Agent, or Firm*—Gerald R. Woods

[57] ABSTRACT

The routing paths between origin and destination nodes in a packet switching network are selected more efficiently by reducing the total number of links potentially visited by the routing algorithm. The path selection technique involves two phases, the first phase for principal links identification, and the second phase for selection of the best point-to-point path in the network. Principal paths are minimum hop count paths with a transmission delay less than a specified threshold. The algorithm limits the screening of the network links in the second phase to the principal links and excludes the secondary links. The exploration of a much smaller number of links has the advantage to considerably reduce the computation time required for the path selection. The fact the number of principal links is generally small compared with the total number of links potentially explored, allows to limit the additional processing time necessary in case of unsuccessful attempt.

4 Claims, 12 Drawing Sheets

| CHARACTERISTIC | | LINK VALUES | | | |
| --- | --- | --- | --- | --- | --- |
| NAME | DESCRIPTION | A | B | ... | N |
| L(P) | Load Threshold if Principal Link | $C_{A,P}$ | $C_{B,P}$ | --- | $C_{N,P}$ |
| L(S) | Load Threshold if Secondary Link | $C_{A,S}$ | $C_{B,S}$ | --- | $C_{N,S}$ |
| T(AL) | Total Allocated Load | $\hat{C}_A$ | $\hat{C}_B$ | --- | $\hat{C}_N$ |
| QOS | Quality of Service Parameters | QOS A | QOS B | --- | QOS N |

FIG 4

METHOD AND SYSTEM FOR IMPROVING THE PROCESSING TIME OF THE PATH SELECTION IN A HIGH SPEED PACKET SWITCHING NETWORK

TECHNICAL FIELD

The present invention relates to a high speed transmission system in a large packet switching network and, more particularly, to an apparatus and a method for accelerating the path selection between a source and a destination node by reducing the total number of links potentially explored by the Modified Bellman-Ford Algorithm.

BACKGROUND ART

It has become increasingly useful to interconnect a plurality of data processing elements by means of a packet switching network in which data is transmitted as data assemblages called "packets". Such networks include a plurality of interconnected switching nodes which, in turn, are connected to end nodes supporting data processing equipments. Such packet networks can become quite large with an extensive geographical distribution. In such a situation, the selection of an efficient path between two end nodes which wish to communicate with each other becomes of paramount importance. Different methods are summarized by H. Nussbaumer in *Teleinformatique II* (pages 92 to 117) *Presses Polytechniques Romandes* 1987.

PATH SELECTION

The general problem which must be solved at the network level is to find a path between a source and a destination node. When the network is using datagrams, the path selection must be done individually for each packet. For virtual circuits, the path decision is done once only at the time of the circuit establishment. In both cases, the choice of a routing algorithm is not easy because it must satisfy a large number of often conflicting requirements. This algorithm must be simple to implement to not complicate the nodes realization, it must ensure a correct progress of the packets whatever the disturbance on the network. The algorithm must be able to provide satisfying results despite of the traffic variations and the network topology. It must also ensure the equity between the different end users and provide an equal distribution of the rights to access the network. At last, the routing algorithm must allow, when possible, to exploit the network in an optimal way, according to a criterion which can vary with the utilization type. In most of the cases, the network is realized in a way to minimize the packet transit time and to transfer the maximum number of packets. In other cases, the objective is to decrease the communication cost, or to develop a reliable network able to operate correctly either in case of catastrophic line, node failure or peaks of traffic.

Because of the variety of the constraints, there are a large number of different routing types like Flooding Routing, Random or Stochastic Routing, Deterministic Routing. This last technique is one of the most widely used. Two modes of operation are opposed: the Fixed Routing and the Adaptive Routing.

Fixed Routing

The Fixed Routing defines paths that must take the different packets according to the general network characteristics such as the network topology and the mean traffic expected on the communication lines. The routing rules are established once and aims for optimizing the performance criterion privileged by the user. The Fixed Routing is very simple in its principles and allows to considerably speed up the packet transmission through the network.

Adaptive Routing

Contrary to the Fixed Routing, the purpose of the Adaptive Routing is to satisfy at any time the optimization criterion. The tables are permanently updated according to, for example, the instantaneous state of the traffic on the lines.

Centralized Routing

When the characteristics of the network fluctuate, it is possible to adapt the routing by assigning to one node the responsibility to update periodically the routing tables according to the traffic variations and the topology. This method, simple in its principles, is called Centralized Routing. Its principal disadvantage is to generate an important auxiliary traffic and to subordinate the good functioning of the network to only one node. Furthermore, the Centralized Routing can generate some problems at the time the tables are refreshed because said tables cannot be received at the same time by all the nodes. A solution is to decentralize the tables establishment at the level of each node.

Local Routing

The local and distributed routing methods are both based on the establishment by each node of its own routing table according to information locally collected. In its most simple form, the method consists in placing the packet just received in the shorter output queue and in transmitting it as rapidly as possible. The local algorithm tends in its principle to circulate the packets very quickly in the network. However, as the routes are selected in some way or other the mean paths length is far to be minimal.

Distributed Routing

The Distributed Routing is a local method in which neighboring nodes are exchanging messages concerning the traffic and the network condition to update their routing and delay tables.

HIGH PERFORMANCE NETWORKS

The data transmission is now evolving with a specific focus on applications and by integrating a fundamental shift in the customer traffic profile. Driven by the growth of workstations, the local area networks (LAN) interconnection, the distributed processing between workstations and super computers, the new applications and the integration of various and often conflicting structures- hierarchical versus peer to peer, wide (WAN) versus local (LAN) area networks, voice versus data—the data profile has become higher in bandwidth, bursting, non deterministic and requires more connectivity. Based on the above, it is clear that there is strong requirement for supporting distributed computing applications across high speed networks that can carry LAN communications, voice, video, and traffic among channel attached hosts, business, engineering workstations, terminals, and small to intermediate file servers. This vision of a high speed multiprotocol network is the driver for the emergence of fast packet switching networks architectures in which data, voice, and video information is digitally encoded, chopped into small packets and transmitted through a common set of nodes and links.

Throughput

The key requirement of these new architectures is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. For example (FIG. 1), taking a node with an effective processing rate of 1 MIPS (Millions of Instructions Per Second), it is possible to fill a 9.6 kbps line with 1000 byte packets even if a network node must execute 833 000 instructions per packet processed. For a 64 kbps line the node can afford 125 000 instructions per packet. In order to fill an OC24 link, however, our 1 MIPS node could only execute 7 instructions per packet. In the latter case even an effective rate of 10–30 MIPS would allow only 70–200 instructions per packet.

In order to minimize the processing time and to take full advantage of the high speed/low error rate technologies, most of the transport and control functions provided by the new high bandwidth network architectures are performed on an end-to-end basis.

Routing Modes

The routing within the network presents two aspects:
1. Determining what the route for a given connection shall be,
2. Actually switching the packet within a switching node.

There are many methods of determining a route through a network. For very high throughput, the critical item is that the switching elements must be able to decide where to route an incoming packet in a very short portion of time. As described in the document *High Speed Networking Technology, An Introductory Survey* (pages 88 to 96) - GG24-3816-00 ITSC Raleigh March 1992, the routing modes the most widely used are the Source Routing and the Label Swapping.

Source Routing

The Source Routing is a particular implementation of the Distributed Routing for connectionless networks. The source node (or access node) is responsible for calculating the route the packet must take through the network. A routing field is appended to every packet sent and that field is used by the intermediate nodes to direct the packet towards its destination of a path. Each packet is routed through the network as a self contained unit and is independent of all other packets. The key point for the source node is to determine for each datagram the optimal route in the shorter lapse of time.

Label Swapping

The Label Swapping is a particular implementation of the Distributed Routing for connection oriented networks. These networks typically multiplex many connections (or sessions) on a link using some form of logical "channel". Each packet sent on the link has a header which includes an arbitrary number identifying which logical connection that this packet belongs to.

The call set up and the resource-reservation process comprises the following steps:

A connection request is specified by the user via a set of parameters including origin and destination address and data flow characteristics.

The path determination is realized by the source node from its local routing Topology Database The route reservation is sent out in a special message along the specified nodes. Said message, which is usually routed according to the previously described Source Routing technique, signals the nodes to set up their connection tables and to reserve their resources to provide the level of service required by the traffic type (for example, a bandwidth reservation on each of the links of the path).

The tables update reflects the changes in the availability of the network resources. The information is sent to every node in the network.

The Label Swapping technique requires that the connection tables be set up and maintained dynamically. That means that when a new connection is established or an old one is terminated the tables are updated (the database of network topology can of course be maintained quite separately). This is possible if the connection set up is relatively infrequent and is not too time critical. This restriction makes datagram transport quite inefficient. However, connections that require very short packets, like real-time voice connections, can be effectively supported by this technique, because of the low packet overhead. All is needed is a field to specify which connection is to be used for the packet.

Key Requirements

The Distributed Routing mechanism in large and high speed packet switching networks supporting both connection oriented and connectionless routing modes implies some requirements in terms of performance and resource consumption which can be summarized as follows:

the source node (or the node providing the route calculation for the source node) must be able to decide where to route an incoming packet in a very short portion of time (the computation must be sufficiently rapid to compute an optimum path for each connection request)

the switching time in the intermediate nodes must be minimized, (minimum processing time)

the network resources along the selected path must be optimized according to the customer criterions.

Control messages must be as much as possible limited not to overload the network.

PATH SELECTION CRITERIONS

Bellman-Ford Algorithm

There are several possible adaptive routing algorithms to compute an optimal path between nodes in a packet network. The Bellman-Ford algorithm described by D. Bertsekas and R. Gallager in *Data Networks*—Prentice-Hall 1987 Englewood Cliffs, N.J.—is one of the most currently used in fast packet packet switching networks. The objective of the algorithm is to find a path joining two nodes with the minimum length, the length being defined to reflect the congestion of the link. The algorithm starts from the source node and first find the shortest path lengths subject to the constraint that the paths contain at most one link. Then, it find the shortest path lengths with a constraint of paths of at most two links, and so forth.

Let

N the number of nodes (labeled 1, 2, ..., N).

M the number of unidirectional links. It is assumed that there is at most one unidirectional link going from one node to another, and so a link can be identified by its end points.

h the number of hops,

D (i,h) the shortest ($\leq$h) path length from source node (1) to node (i). By convention D (1,h)=0 for all h.

$d_{ij}$ the length of the link connecting node (i) to node (j). By convention $d_{ij}=\infty$ if nodes (i) is not connected to node (j).

Initially $D(i,0)=\infty$ for all i≠1

For each successive $0 \leq h$, $D(i,h+1)=\min_j[D(j,h)+d_{ji}]$, j=1, ..., N for all i≠1

A path can contain at most N−1 links. In the worst case, the algorithm must be iterated N−1 times, each iteration must be done for N−1 nodes, and, for each node, the minimization must be taken over no more than N−1 alternatives. Thus the amount of computation grows at worst as $N^3$.

Let D(i) be the shortest path length from node (1) to (i), with D(1)=0, then the equation converges with h=N−1 and can be written:

$$D(i)=\min_j[D(j)+d_{ji}], \text{ for all } i\neq 1$$

$$D(1)=0$$

This is called Bellman's equation and expresses that the shortest path length from node (1) to (i) is the sum of the path length to the node before (i) (on the shortest path) plus the distance on the final link of the path.

Modified Bellman-Ford Algorithm

As described with the Bellman-Ford algorithm, one of the major criterion for selecting paths between nodes in packet networks is the minimum path length. The path length depends of the customer criterions. In most of the cases, the length is a function of the overall transmission delay imposed by the path between the two end nodes. In most high speed networks, the delay (path length) is not a major consideration since the worst-case delay through such networks is nearly always acceptable. The hop count, however, is a direct measure of the amount of resources required to implement a given path and hence is of considerable importance in selecting paths. The hop count is defined as the number of links used to construct the path between two nodes. A selected path need not be a minimum hop count path since congestion on the network links may force the choice of a larger hop count path. However, such longer alternate paths cannot be allowed to grow without limit since inordinate amounts of network resources might be committed to one path, resulting in further congestion for other paths and forcing yet longer hop count paths to be selected for yet other connections. The long term network throughput could thereby be adversely affected. The problem, then, is to select a path between an origin node and a destination node which has a minimum hop count, a minimum path length, which does not utilize an inordinate amount of network resources.

The goal of the Modified Bellman-Ford algorithm is to find a path, between a given source and destination node pair, with a minimum number of links connecting the source and the destination node and with a minimum path length.

The algorithm starts from the source node and progresses by increasing the hop count (the number of links) until it finds a feasible path. At each hop count h, the algorithm finds the smallest path length from the source node to each intermediate node with exactly h links.

Let D(i,h) the smallest path length from the source node to the node (i) with exactly h hops:

$$D(i,h)=\min_j[D(j,h-1)+d_{ji}], j=1, \ldots N \text{ for all } i\neq 1$$

where, by convention, $d_{ji}=\infty$ if link (ji) does not exists (which include the case i=j).

The algorithm stops at hop count $h^x$, $D(d,h^x)$ being the smallest path length among all the minimum hop feasible paths.

The difference between the Bellman-Ford and-the Modified Bellman-Ford algorithms is that in the Bellman-Ford keeps going until it finds a path with the smallest path length (It stops when the smallest path length to each intermediate node cannot be further reduced or when all hop counts have been tried).

European Patent Application 93480030.1

European Patent Application 93480030.1 entitled - Methods and Apparatus for Optimum Path Selection in Packet Transmission Networks discloses a method to select optimum paths between origin and destination nodes by means of a improvement of the Modified Bellman-Ford algorithm. The method defines "principal paths" between any given origin-destination pair. A principal path is defined as a feasible minimum-hop count path and principal links are defined as links in a principal path. All other links are defined as secondary links. Secondary paths are paths including at least one secondary link and including more than the minimum-hop count.

A principal path is accepted as a route if none of its principal links is saturated, that means exceeds its preassigned traffic load.

A secondary path, however, is accepted as a route only if none of its principal links, if any, is saturated and if the load levels on its secondary links are below a preselected threshold (typically lower than that for links designated as principal). If this load threshold is exceeded on any of the secondary links, the secondary path is rejected as a route.

One advantage of the path selection technique of this invention is that a maximum path length constraint can be imposed on the path selection process. That is, feasible paths can be tested to determine if the path length constraint has been exceeded and rejected if the constraint is exceeded. Such constraints can be used to prohibit inordinate resource consumption in implementing a route and can also be used to impose specific grade of service requirements such as avoidance of low speed links. For this reason, the path length constraints must typically be specified for each connection request, and the principal links determined separately for each connection request.

The algorithm is invoked with some of the following parameters:

the source node address, the destination node address, the quality of service required for the connection. For example:

maximum call set up delay (very important parameter for connections serviced in real time), maximum end to end transit delay, maximum information loss, error probability,

...

The algorithm uses in the source node (or access node) a local copy of the network topology to determine the minimum hop and path length to the destination node.

The route selection technique of European Patent Application 93480030.1 involves two phases. In the first phase, the principal links are identified for the requested connection. If no maximum length constraint is imposed, the principal links between any two nodes of the network can be precomputed and stored for use in the second phase of the algorithm. If a maximum length constraint is imposed, the principal links must be calculated for each new connection request, comparing each link length with the constraint, or the constraint decreased by the previously accepted principal link lengths.

This route determination technique has the advantages of producing optimum paths between arbitrary nodes of a packet switching system, taking into account not only the hop count and the path length, but also imposing a maximum ceiling on the path length.

But the problem is to compute the paths sufficiently rapidly so that an optimum route can be selected for each connection request.

SUMMARY OF THE INVENTION

In accordance with the illustrative embodiment of the present invention, optimum routing paths between origin and destination nodes in a packet network are selected more efficiently by reducing the total number of links potentially explored by the Modified Bellman-Ford Algorithm described in the European Patent Application 93480030.1. The path selection technique of the present invention involves two phases, the first phase for principal links identification, and the second phase for selection of the best point-to-point path in the network.

More particularly, the algorithm of the present invention limits the screening of the network links in the second phase to the principal links and excludes the secondary links. The exploration of a much smaller number of links has the advantage to considerably reduce the computation time required for the path selection. The fact the number of principal links is generally small compared with the total number of links potentially explored, allows to limit the additional processing time necessary in case of unsuccessful attempt.

In summary, the present invention discloses a system and a method for determining an optimal routing path between an originating and a destination node in a network. Said method involves the steps of:

storing and updating the network configuration, in a first phase:

identifying principal paths including minimal hop count and minimal transmission delay between said originating node and said destination node in said network, identifying principal and secondary links, determining, in a second phase and in response to said step of identifying principal paths and links, an optimal path between said originating and destination nodes, and is characterized in that it further comprises the steps of:

determining, in said second phase, an optimal path using only principal links, determining, when the destination node is not reached using said principal links, an optimal path using principal and secondary links.

Said step of determining an optimal path on principal and secondary links, is using link utilization data previously computed on principal links by said step of determining an optimal path on said principal links.

DESCRIPTION OF THE DRAWINGS

FIG. 4 shows a portion of the Topology Database in each Routing Point.

DESCRIPTION OF THE PREFERRED EMBODIMENT OF THE INVENTION

Figure 1:
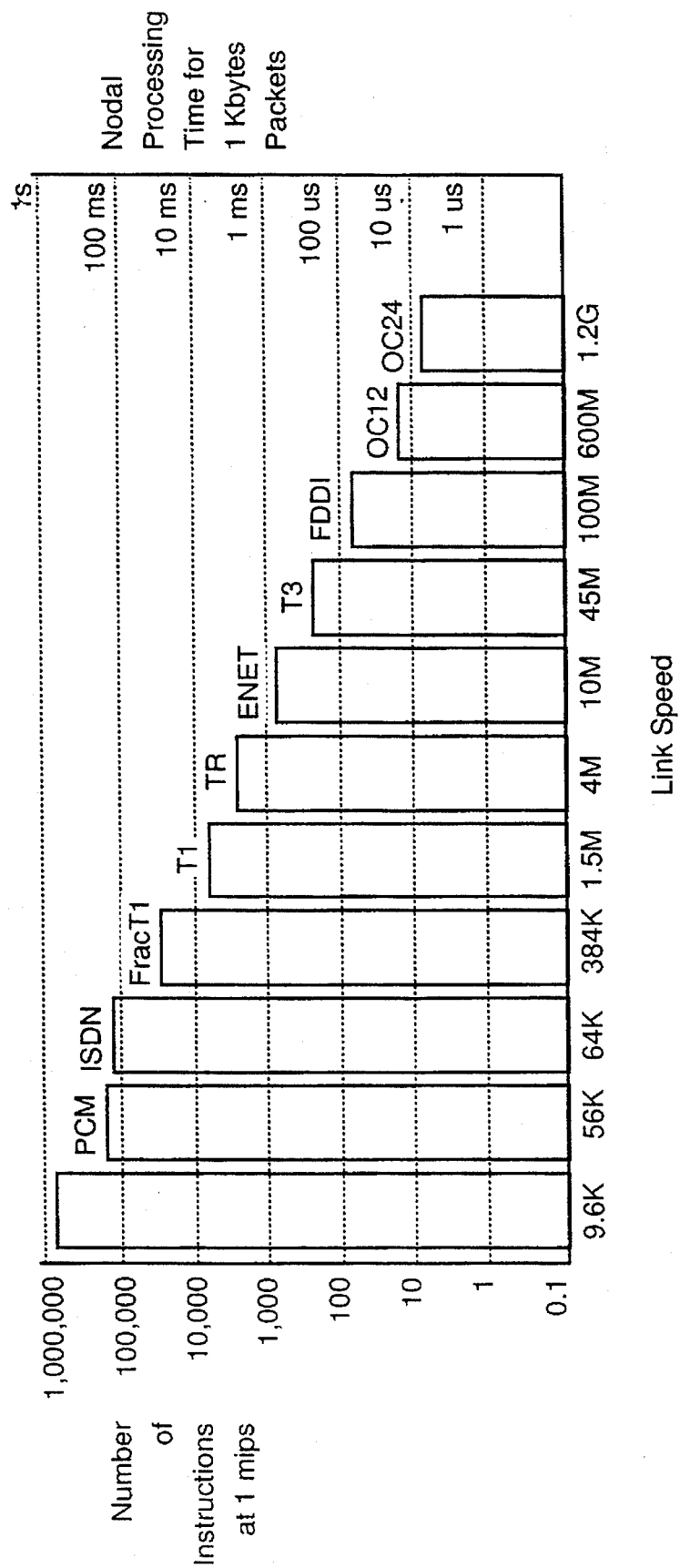
FIG. 1 shows the processing times (or number of instructions per second) required in function of the different line throughputs supported by the high speed networks.
Figure 2:
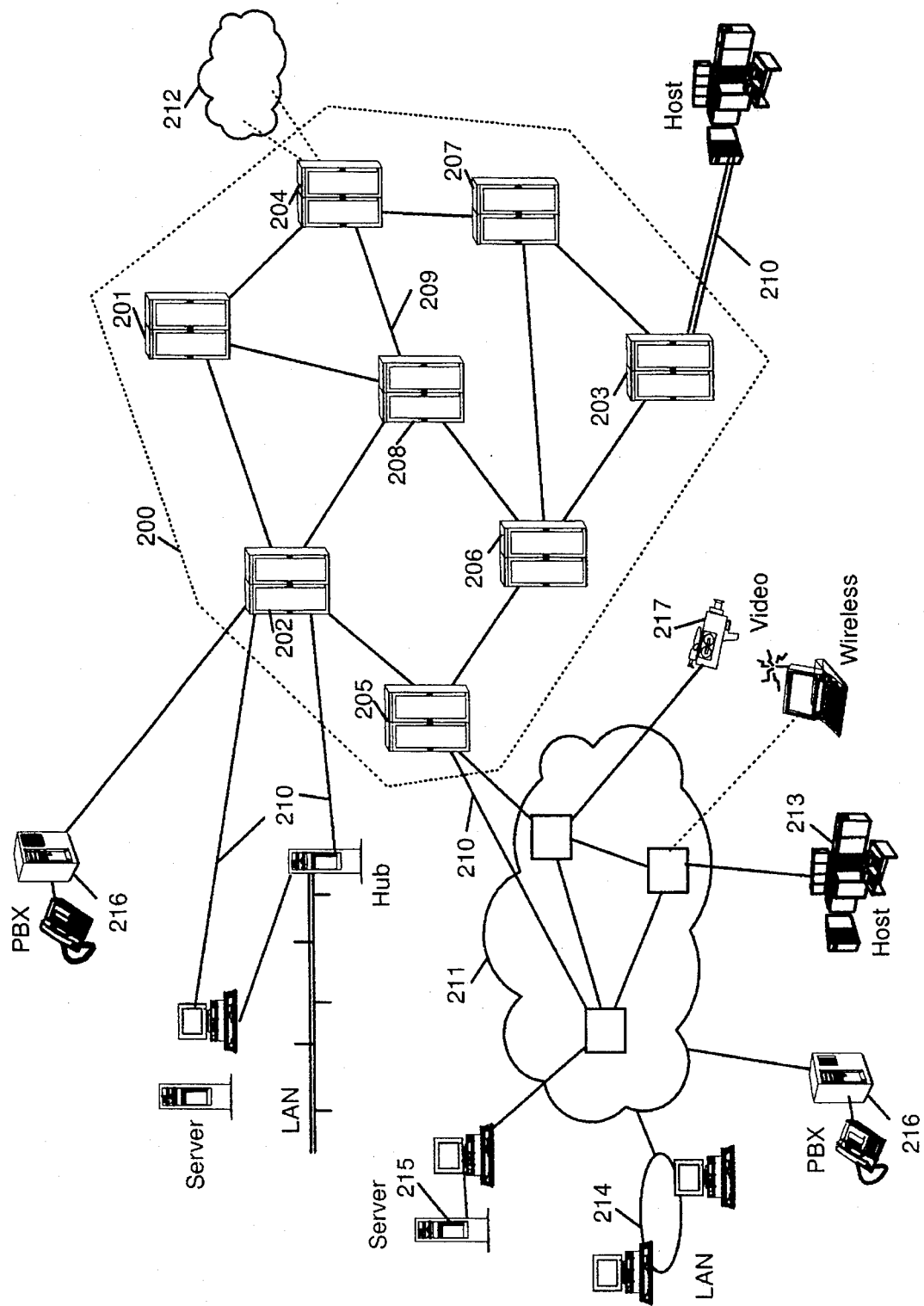
FIG. 2 shows a typical model of high speed packet switching network including the access and transit nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personnel computers attached on LAN (Local Area Networks 214), applications servers (215), PBX (Private Branch exchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High Speed Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Pods, each one providing an access point for attaching external devices supporting standard interfaces to the network and performing the conversions required to transport the users data flow across the network from and to other external devices. As example, the Access Node 202 interfaces respectively a Private Branch exchange (PBX), an application server and a hub through three Pods and communicates through the network by means of the adjacent Transit Nodes 201, 208 and 205.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

- the determination of routing paths for packets originated in the node,
- directory services like retrieving and updating information about network users and resources,
- the maintaining of a consistent view of the physical network topology, including link utilization information, and
- the reservation of resources at access points of the network.

Each Pod is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Pod. This header is made of Control and Routing Fields.

- The Routing Fields contain all the information necessary to route the packet through the network (200) to the destination node to which it is addressed.
- The Control Fields include, among other things, an encoded identification of the protocol to be used in interpreting the Routing Field (Source Routing, Label Swapping, . . . ).

Routing Points

Figure 3:
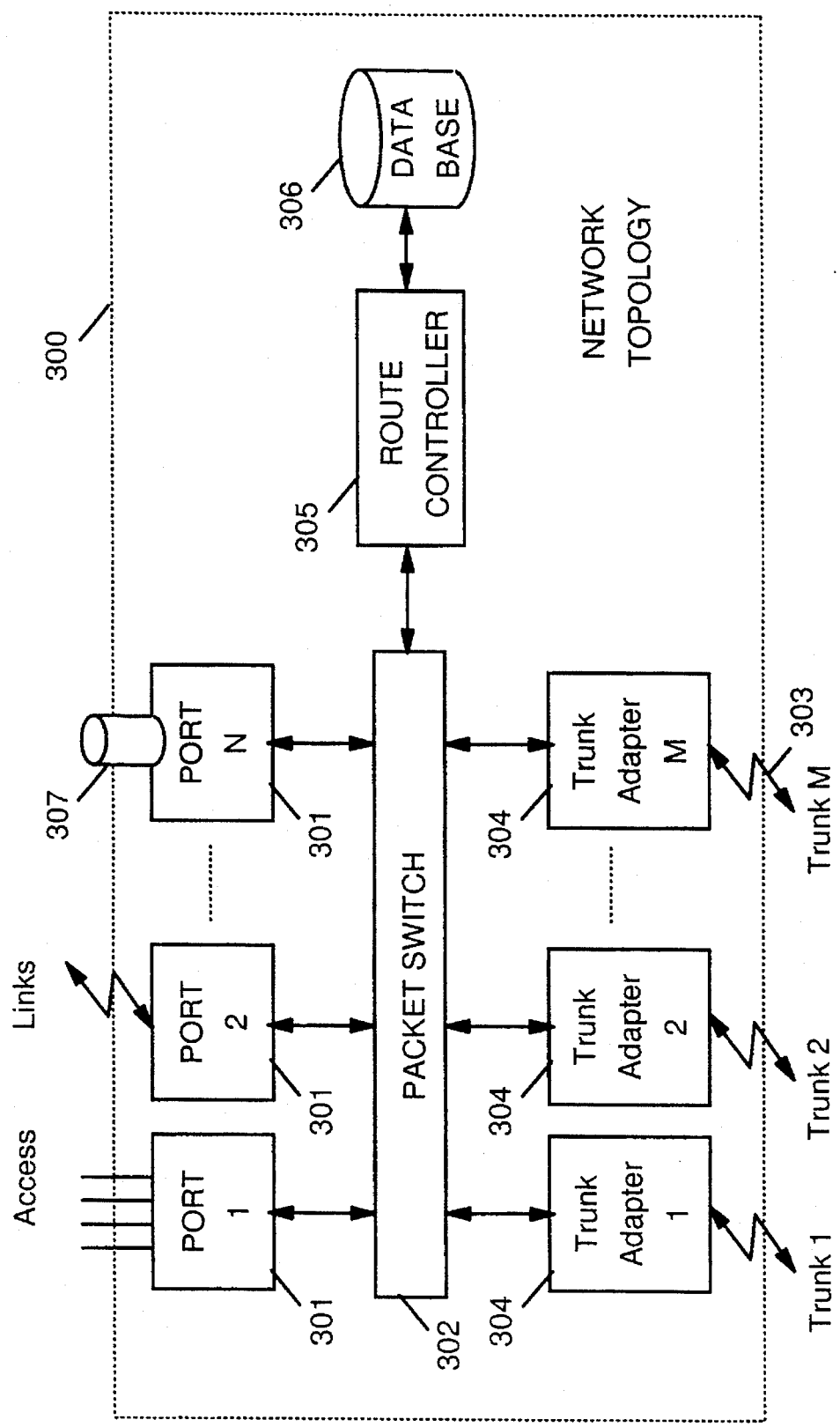
FIG. 3 describes a high speed Routing Point according to the present invention.

FIG. 3 shows a general block diagram of a typical Routing Point (300) such as it can be found in the network nodes (201 to 208) illustrated in FIG. 2. A Routing Point comprises a high speed packet Switch (302) onto which packets arriving at the Routing Point are entered. Such packets are received:

- from other nodes over high speed transmission links (303) via Trunk Adapters (304).
- from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum routes through the network (200) so as to satisfy a given set of quality of service specified by the user and to minimize the amount of network resources used to complete the communication path. Then, it builds the header of the packets generated in the Routing Point. The optimization criterion includes the number of intermediate nodes, the characteristics of the connection request, the capabilities and the utilization of the Trunks in the path . . . All the information necessary for the routing, about the nodes and transmission links connected to the nodes, are contained in a Network Topology Database (306). Under steady state conditions, every Routing Point has the same view of the network. The network topology information is updated when new links are activated, new nodes added to the network, when links or nodes are dropped or when link loads change significantly. Such information is originated at the network node to which the resources are attached and is exchanged by means of control messages with all other Route Controllers to provide the up-to-date topological information needed for route calculation (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

LINK CHARACTERISTICS

Topology Database

FIG. 4 shows, in tabular form, a portion of the information stored in the Topology Database 306. The different characteristics of each link in the network are listed in the database. For the present invention, only a few of these characteristics will be discussed.

Load Threshold

As might be expected, one of the critical characteristics of the transmission links is the Load Threshold available. Moreover, it is well known that such transmission facilities can only be loaded up to a fraction of their theoretical maximum load (bandwidth) if reasonable transmission properties have to be maintained. The Load Threshold of such a transmission facility can be represented by the quantity $C_{kl}$ (the effective load capability of the transmission link between nodes (k) and (l)). Two different Load Thresholds, L(P) and L(S), are defined for each transmission links, depending on whether the link is selected as a principal link in a route or as a secondary link in the route.

Principal and Secondary links

A principal link is defined as a leg of a principal path where a principal path is a feasible minimum hop count path between the originating node and the destination node. The hop count h is simply the number of transmission links in the path. All other links are defined to be secondary links. Any non-minimum hop count path between the originating node and the destination node is called a secondary path and it always includes at least one secondary link.

A principal path is preferred over a secondary path in determining optimum routes between nodes. The computation time necessary is also significantly shorter for a principal path than for a secondary path. If, however, a principal path is not available due to its already being fully loaded, a secondary path can be chosen. In order to discriminate against such a secondary path, a Load Threshold $C_{kl,S}$ is defined for each secondary link which is less than the corresponding principal Load Threshold $C_{kl,P}$ for that same link ($C_{kl,P} \geq C_{kl,S}$). That is the reason why the table of FIG. 4 includes two different Load Thresholds for each transmission link, one to be used if the link is a principal link in a route being calculated and the other to be used in the link if a secondary link in the route being calculated.

Total Allocated Load

The table includes the Total Allocated Load, T(AL), for each link. The value $\hat{C}_{kl}$ represents the total load (or bandwidth) which has already been allocated for the transmission link kl (transmission link between nodes (k) and (l)) due to previously calculated routes. If the difference between this already allocated load $\hat{C}_{kl}$ and the total available principal or secondary load of the channel $C_{kl}$ ($C_{kl,P}$ or $C_{kl,S}$ depending on the whether the link is a principal link or a secondary link) is not sufficient to carry the new connection, then the link cannot be selected.

As described in European Patent Application 93480030.1 the present invention uses also a maximum delay defined as $P_T$ and optionally some "Quality of Service" parameters (QOS). Such QOS parameters may include, for example, a particular security level, a packet size or a minimum probability of overflow . . .

ROUTE DETERMINATION

Route Request

Each request for a route determination includes the following input parameters:

Source Node (i)

Destination Node (j)

Required Bandwidth (c)

Maximum Path Length Threshold ($P_T$)

Quality of Service Parameters (QOS) (Optional)

The requested maximum path transmission delay is generally taken as Path Length Threshold ($P_T$). Using these parameters, a path is determined by first searching through all links to determine minimum hop count paths that satisfy the maximum path length constraint $P_T$ and then backtracking to derive a list of principal links. This search is supplemented by accumulating the link delays $d_{kl}$ for each path. Once the destination node is reached, minimum hop count principal paths are backtracked to create a list of principal links. This principal link list is used in the second phase of the algorithm to determine the optimum path from the source to the destination node. This specific procedure for determining paths through a packet communications system will be described with reference to FIGS. 5, 6, 7, 8 and 9.

Path Determination Procedure

Figure 5:
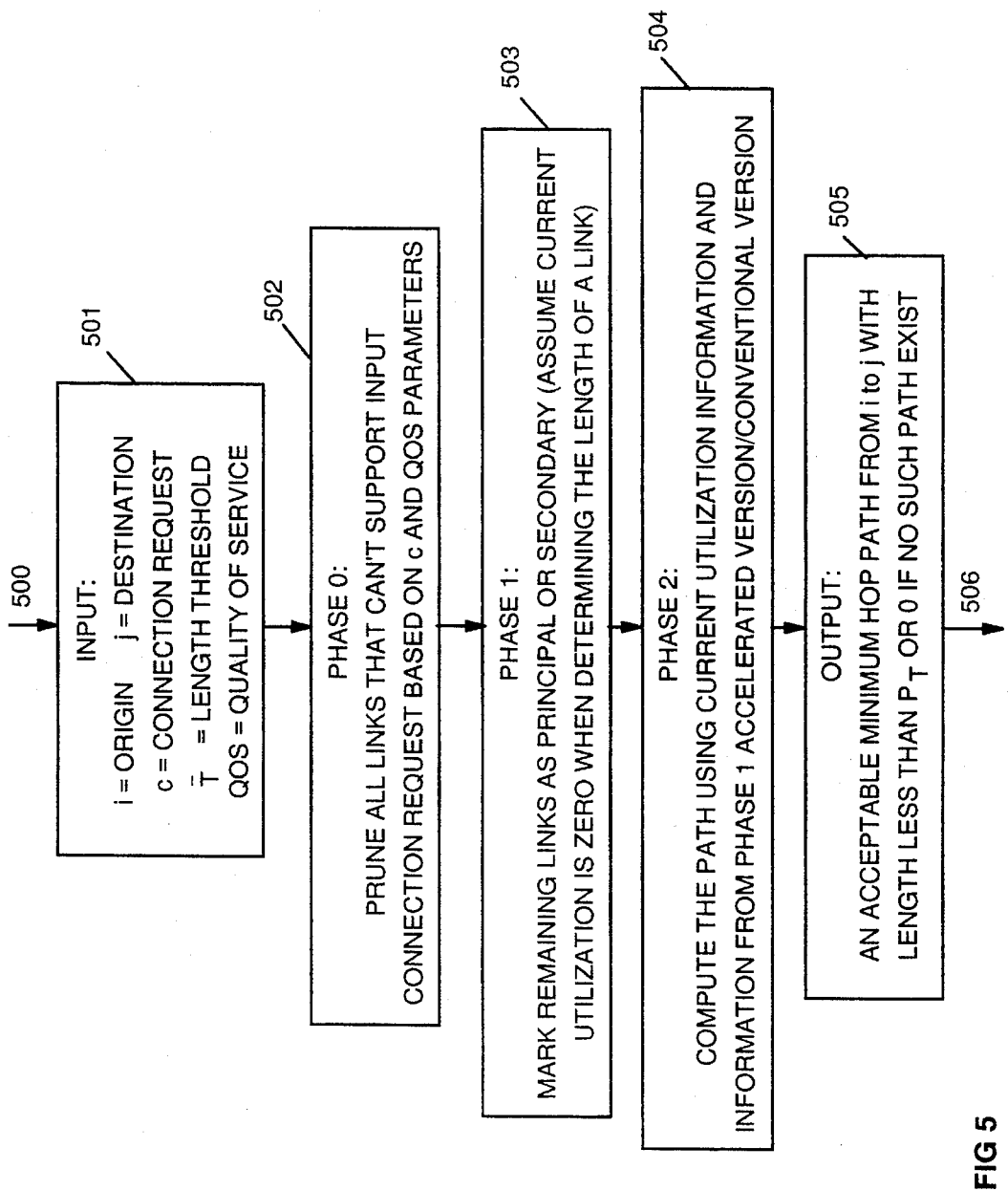
FIG. 5 shows a general flow chart of the path determination procedure according to the present invention.

FIG. 5 shows a general flow chart of the path determination procedure according to the present invention.

b 1.Data Input (501)

Starting at 500, step 501 first specifies the inputs required to calculate an optimum route. As noted above, these input parameters include the originating node (i), the destination node (j), the requested connection bandwidth (c) and the maximum Path Length Threshold $P_T$ (and optionally a group of Quality Of Service (QOS) parameters).

2. Phase 0 (502): Bandwidth Requirements

The list of links in the network is pruned by removing all links which do not meet the required bandwidth c ($c \geq C_{kl}$) and the Quality Of Service (QOS) parameters.

3. Phase 1 (503): Principal and Secondary Links Search

With this decimated list of transmission links, the function of Phase 1 (503) is to identify the principal links. In determinating the lengths of the transmission links $\Sigma d_{kl}$, the process assumes that the utilization of each link is zero (($\hat{C}_{kl}$=0), which means that the entire bandwidth of the link is available. The process used to search for principal paths is the Modified Bellman-Ford Algorithm described in Patent Application 93480030.1.

4. Phase 2 (504): Optimum Path Computation

Once the principal paths have been identified (503), the function of Phase 2 (504) is to identify the optimum path, using the principal paths from Phase 1 (503), and the current utilization data (allocated bandwidth ($\hat{C}_{kl}$). It exists two different options for Phase 2, an Accelerated Version and a Conventional Version:

The Conventional Version is similar to Phase 2 described in Patent Application 93480030.1, The Accelerated Version, object of the present invention, represents a significant improvement in the process of the path selection by limiting the screening of the network to the principal links. This version will be described in detail hereafter.

5. Acceptable Path Determination (505)

As noted in 505, the output of Phase 2 (504) is an acceptable minimum hop count path from the originating node (i) to the destination node (j) if it has the minimum possible hop count and if its path length is less than the input maximum of $P_T$ ($\Sigma d_{kl} \leq P_T$). If no such path exists, a failure signal is returned. The process ends in 506.

Note: No detailed flow chart of Phase 1 is shown due to the fact that this phase is strictly identical to the one described in FIG. 6 of Patent Application 93480030.1.

Phase 2

1. Accelerated Version

Figure 6:
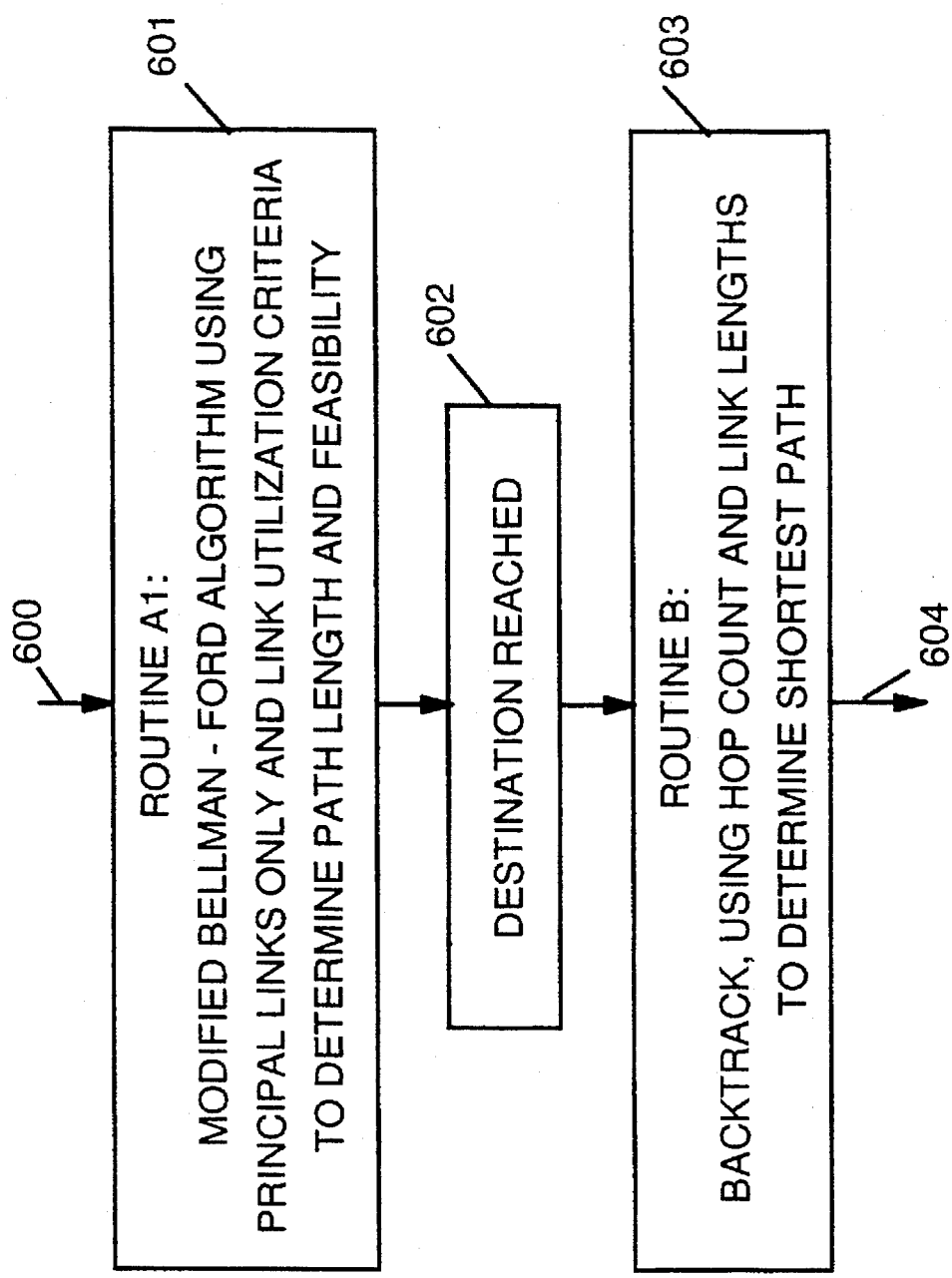
FIG. 6 shows a detailed flow chart of the accelerated option of Phase according to the present invention.

FIG. 6 shows a more detailed flow chart of the Accelerated Version of Phase 2 where the optimum path is computed. Starting in 600, Routine A1 (601), similar to Routine A in Phase 1, is executed. Routine A1 uses the same modified Bellman-Ford Algorithm to determine the feasibility and the link length for each possible link in the ultimate path. The main difference resides in the fact that only principal links are considered in the links exploration part of the algorithm. Principal links are accepted as feasible only at the condition that the load capacity is available for the new connection, i.e., $\hat{C}_{kl}^{(2)}$ does not exceed the principal link load threshold $C_{kl,P}$. Secondary links are not considered. If the destination node is not reached at the end of Routine A1 the process switches to the conventional method detailed in FIG. 7. If the destination node is reached (602), the list of feasible links are backtracked (603) through using the hop count and the path lengths to find the shortest principal path, all the principal paths having the same minimum hop count. The process of FIG. 6 ends in 604.

2. Conventional Version

Figure 7:
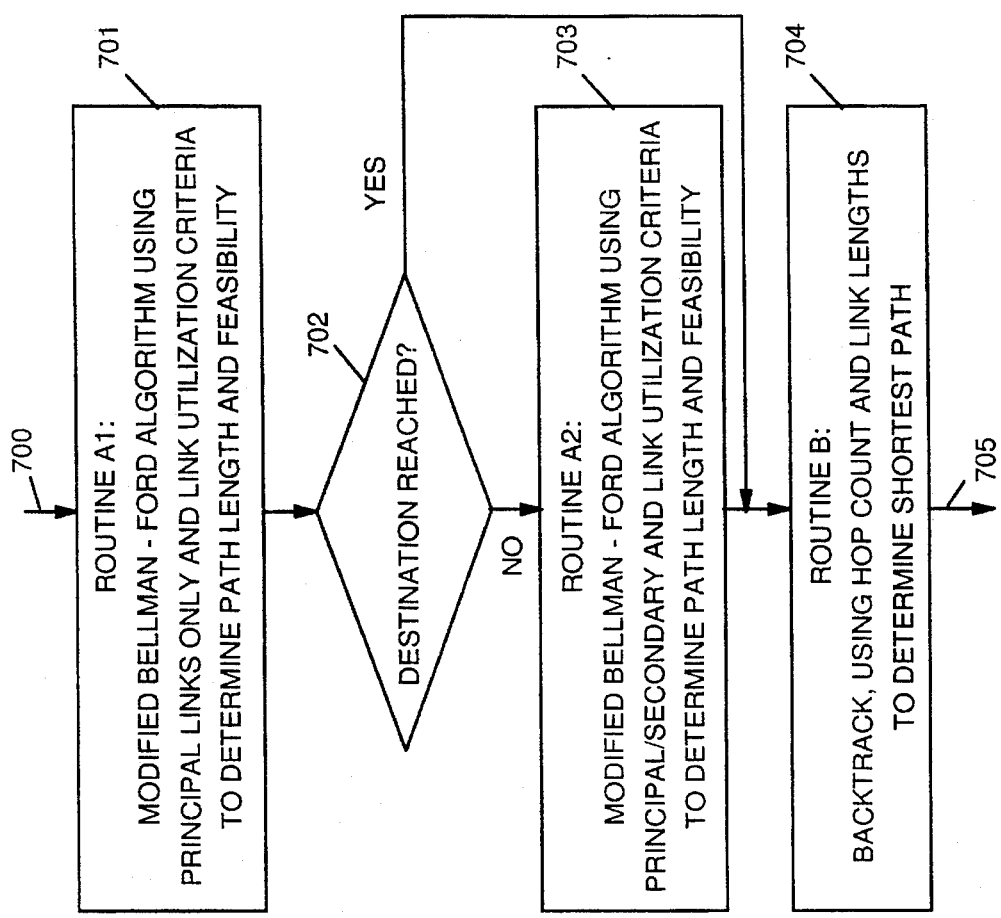
FIG. 7 shows a detailed flow chart of the conventional option of Phase 2 according to the present invention.

FIG. 7 shows a more detailed flow chart of Phase 2 in which the optimum path is computed. The Phase 2, according to the present invention includes an Accelerated (701, 704) and a Conventional (703, 704) Version. The Conventional Version is the process used when Routine A1 of the accelerated option does not succeed in reaching the destination node of the desired path. Phase 2 starts in 700 with the accelerated version. If the destination node is not reached at the end of the Routine A1 (701) (decision point 702) after all principal links have been searched in order to find a feasible principal path, Routine A2 (703) is executed. Routine A2 operates according to the conventional method described in European Patent Application 93480030.1. It considers both principal and secondary links: secondary links are accepted as feasible provided that adding the new connection does not result in exceeding the secondary link load threshold $C_{kl,S}$. However routine A2 benefits from all the checkings and computations related to $\hat{C}_{kl}^{(2)}$ previously done for the principal links by Routine A1 in 701. That is the reason why the chaining of the two Routines, A1 (701) and A2 (703), does not sensibly degrade the Phase 2 of the present invention compared with the Phase 2 described in European Patent Application 93480030.1. In step 704, the list of feasible links are backtracked through using the hop count and the path lengths to find the shortest path with the minimum hop count. The Phase 2 ends in 705

Note:
The modified Bellman-Ford Algorithm used in Routine A of Phase 1, Routine A1 of the Accelerated Phase 2, and Routine A2 of the Conventional Phase 2 is the same as the one described in FIG. 8 of European Patent Application 93480030.1.

Figure 9:
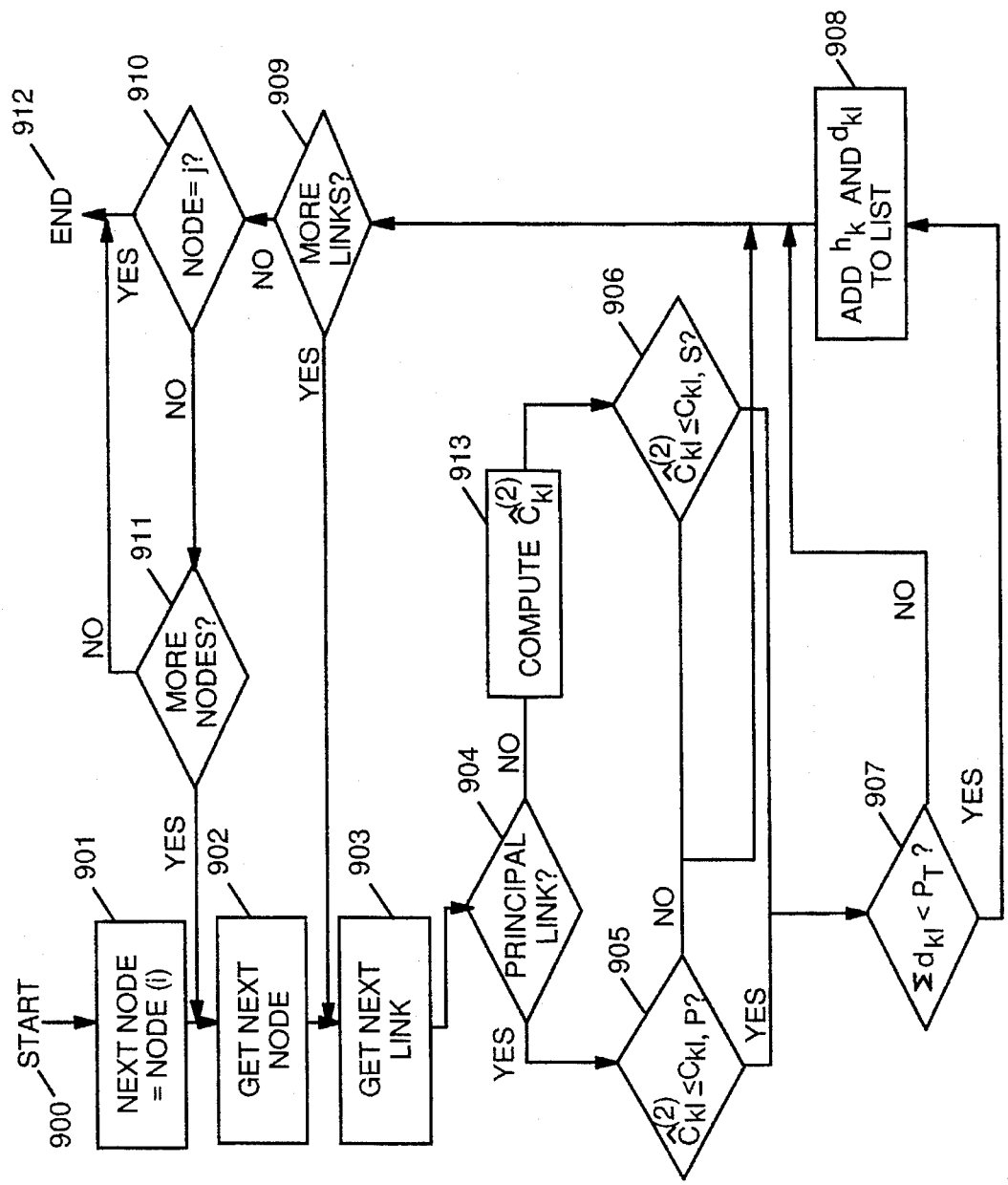
FIG. 9 shows a more detailed flow chart of Routine A2 of the Phase 2 conventional search algorithm according to the present invention.

The Backtracking procedure used in Routine B of Phase 1 and Routine B of Accelerated and Conventional Phase 2 of the present invention is the same as the one described in FIG. 9 of European Patent Application 93480030.1.

Search Algorithm

1. Accelerated Version (Routine A1)

Figure 8:
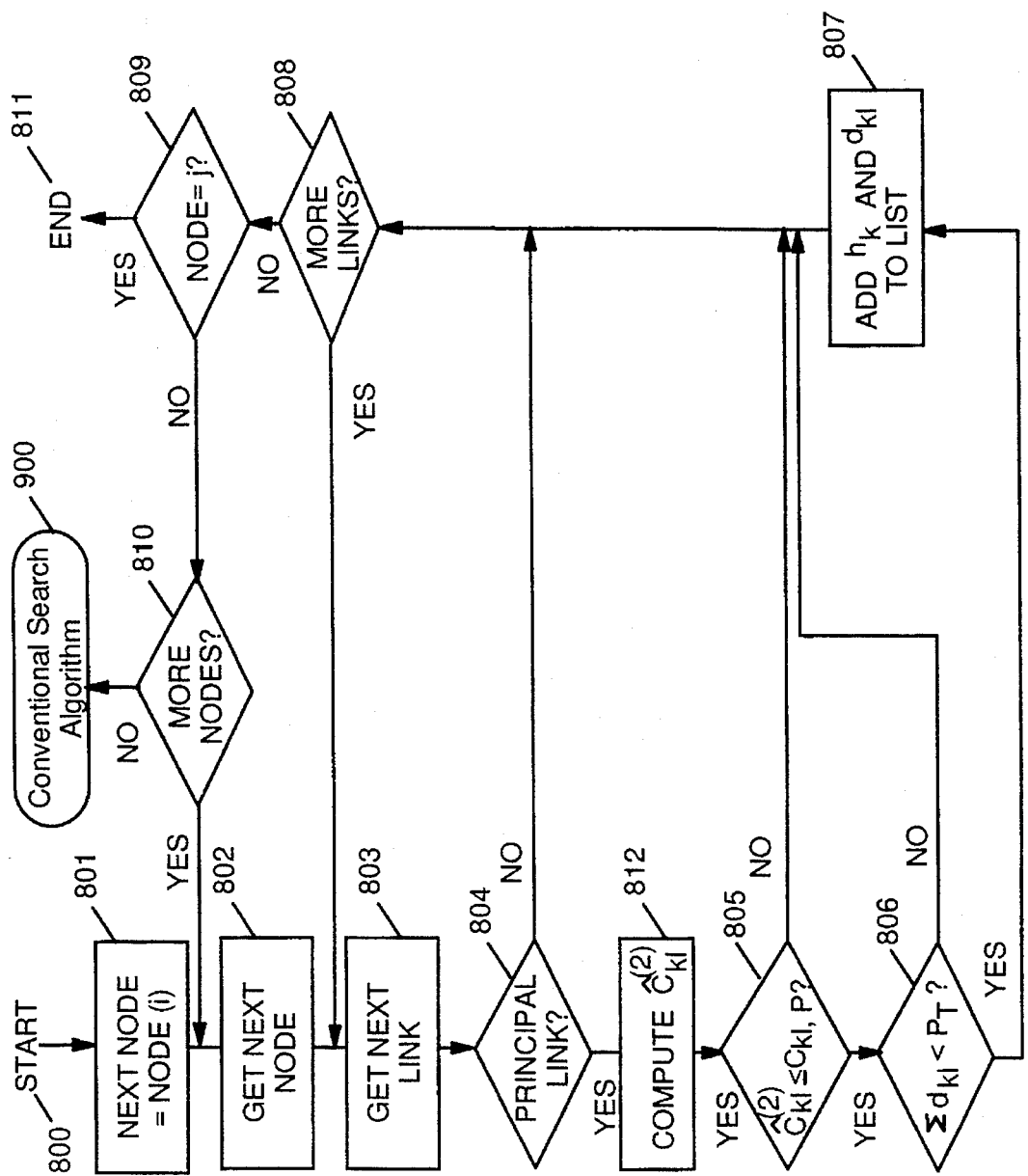
FIG. 8 shows a more detailed flow chart of Routine A1 of the Phase 2 accelerated search algorithm according to the present invention.

FIG. 8 shows a detailed flow chart of the Modified Bellman-Ford Algorithm used to perform the accelerated search for an optimum path. Starting at 800, step 801 first sets the next node to the origin node (i). In 802, the data for the next node is retrieved from the Topology Database (306). In 803, the data for the next link leaving that node is obtained from the same Topology Database (306). Decision point 804 determines whether that link is principal or not:

If the link is principal, decision point 805 is entered:
The accumulated load $\hat{C}_{kl}^{(2)}$ is computed in step 812.:li. Then, :f.C$_{kl}^{(2)}$ is compared to the link principal threshold $C_{kl,P}$:
If the accumulated load is equal to or less than the principal threshold, ($\hat{C}_{kl}^{(2)} \leq C_{kl,P}$), the decision point 806 tests the accumulated path length or delay.
If the accumulated load is greater than the principal threshold as determined by decision point 805 ($\hat{C}_{kl}^{(2)} \geq C_{kl,P}$), the next link is obtained in 808.

If it is determined in decision point 804 that the link is not a principal link, the link is not considered and the next link is obtained in 808.

In decision point 806, the accumulated path length up to this point $\Sigma d_{kl}$ is compared to the maximum path length $P_T$:
If the accumulated path length $\Sigma d_{kl}$ is less than $P_T$, the hop count $h_k$ and the accumulated path length $d_{kl}$ are saved in a list (807), the node reached is also saved in order to proceed with the iteration at the next hop if necessary.
If the accumulated path length $\Sigma d_{kl}$ is equal to or greater than $P_T$, step 807 is bypassed and the data for this link is not added to the list.

In either case, decision point 808 is then entered to determine if there are any more links exiting from this node. If so, step 803 is activated to get the next link and continue the process. If there are no more links exiting from this node, decision point 809 determines if the node is the destination node (j). If so, the process is complete and terminates in 811. If this node is not the destination node (j), decision box 810 determines if there are any more nodes to be screened. If so, step 802 gets the next node and continue the process. If there are no more nodes to be screened, then the accelerated search has failed and the conventional search described in FIG. 9 is started in 900.

When the procedure of FIG. 8 is complete, and destination node (i) has been reached, a list of the minimum hop counts $h_k$ and the path lengths $d_{kl}$ is available. As discussed above, Routine B then backtracks through this list to identify the path with the minimum path delay as well as the minimum hop count. This is the optimum path to be used in sending the packets involved in the connection through the system of FIG. 2.

Figure 10:
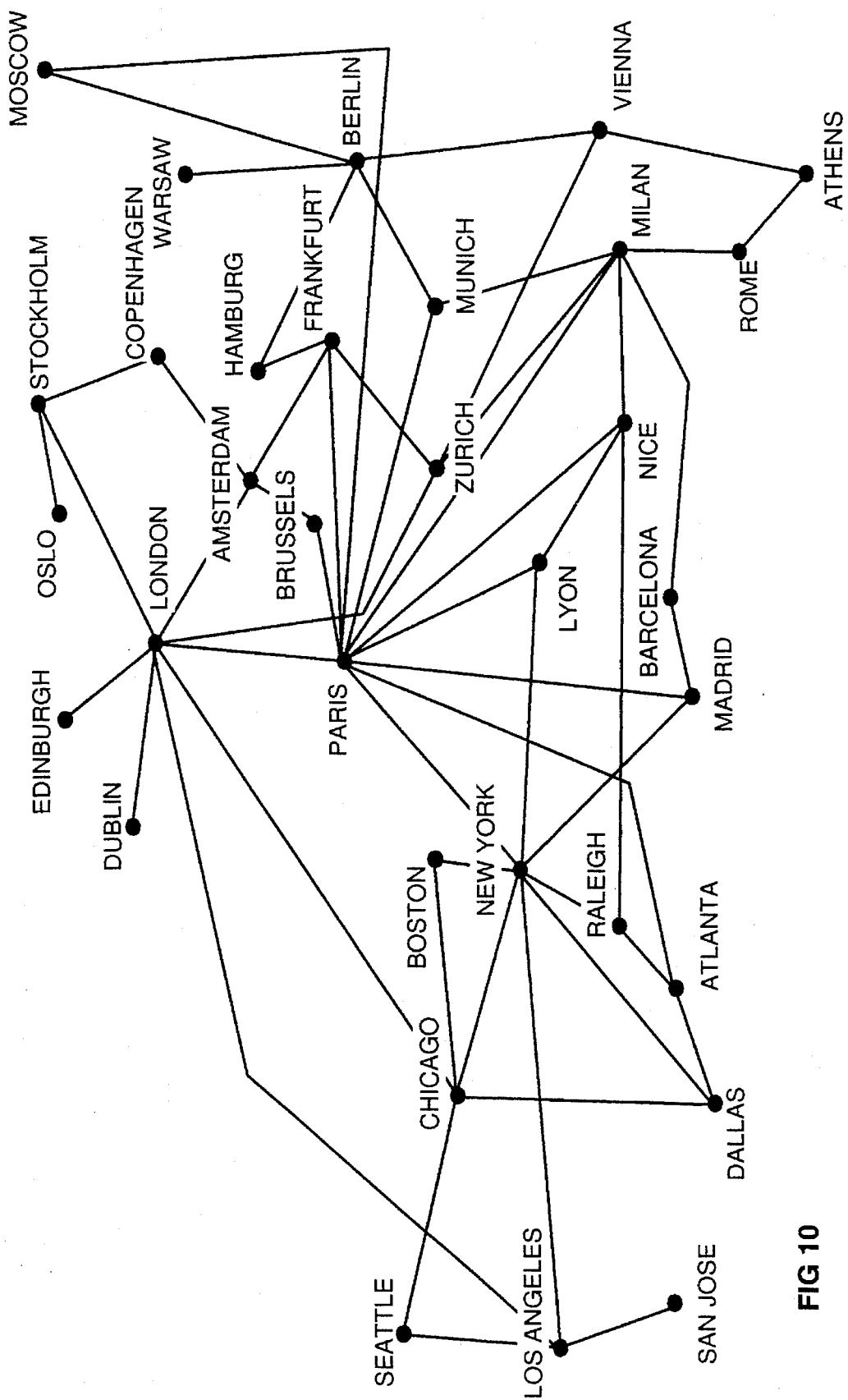
FIG. 10 shows an example of high speed network.

Note: When the Modified Bellman-Ford Algorithm is used to identify the principal paths, the same flow chart as shown in FIG. 10 of Patent Application 93480030.1 is used.

2. Conventional Version (Routine A2)

FIG. 9 shows a detailed flow chart of the Modified Bellman-Ford Algorithm used to perform the conventional search for an optimum path. Starting in 900, step 901 first sets the next node to the origin node (i). In 902, the data for the next node is retrieved from the Topology Database (306). In 903, the data for the next link leaving that node is obtained from the same Topology Database. Decision point 904 determines whether that link is principal or not:

If the link is principal, decision point 905 compares the accumulated load $\hat{C}_{kl}^{(2)}$ the link principal threshold $C_{kl,P}$. This accumulated load has been computed previously during the accelerated search algorithm and so can be reused here.
If the accumulated load is equal to or less than the principal threshold, decision point 907 tests the accumulated path delay.

If the accumulated load is greater than the principal threshold, as determined by decision point 905, the next link is obtained in 909.

⇒ Pseudocode for principal link handling:
IF($k,l$) ∈ $PL$ /* $\hat{C}_{kl}^{(2)}$ available from routine $A1$ */
  IF $\hat{C}_{kl}^{(2)} < C_{kl,p}$
    IF $\Sigma\, d_{kl} < P_T$
      ... /* Continue phase $A2$ execution */

If it is determined in decision point 904 that the link is a secondary link,
the accumulated load $\hat{C}_{kl}^{(2)}$ is computed in step 913, and
then, decision point 906 compares the accumulated load $\hat{C}_{kl}^{(2)}$ to the link secondary threshold $C_{kl,S}$.
If the accumulated load is equal to or less than the secondary threshold, decision point tests the accumulated path delay.
If the accumulated load is greater than the secondary threshold, as determined by decision point 906, the next link is obtained in 909.

⇒ Pseudocode for secondary link handling:
IF ($k,l$) ∉ $PL$ /* $\hat{C}_{kl}^{(2)}$ must be computed */
  Compute $\hat{C}_{kl}^{(2)}$ /* Complex computation involving $C_{kl}^{(1)}$ and $c$ */
  IF $\hat{C}_{kl}^{(2)} < C_{kl,S}$
    IF $\Sigma d_{kl} < P_T$
      ... /* Continue phase $A2$ execution */

In decision point 907, the accumulated path length up to this point is compared to the maximum path length $P_T$.
If the accumulated path length is less than $P_T$, the hop count $h_k$ and the accumulated path length $d_{kl}$ are saved in a list in step 908.
If the accumulated path length is equal to or greater than $P_T$, step 908 is bypassed and the data for this link is not added to the list.

In either case, decision point 909 is then entered to determine if there are any more links exiting from this node. If so, step 903 gets the next link and continues the process. If there are no more links exiting from this node, decision point 910 is entered to determine if the node is the destination node (j). If so, the process is complete and terminates in 912. If this node is not the destination node (j), decision point 911 then determines if there are any more nodes to be screened. If so, step 902 gets the next node and continues the process. If there are no more nodes to be screened, then no path is feasible, the process terminates in 912.

When the procedure of FIG. 9 is complete, a list of the minimum hop counts $h_k$ and the path lengths $d_{kl}$ is available. As discussed above, Routine B then backtracks through this list to identify the path with the minimum path delay as well as the minimum hop count. This is the optimum path to be used in sending the packets involved in the connection through the system of FIG. 2.

EXAMPLE OF IMPLEMENTATION

Path Search in a Typical Network

FIG. 10 shows a typical network used to illustrate the improvements provided by the present invention. It is a packet switched network comprising 33 nodes and 126 unidirectional high speed transmission links (63 trunks) of various capacity: T1 (1.5 Mbps), T3 (45 Mbps), E1 (2 Mbps), E3 (34 Mbps), OC3 , STM1 (155 Mbps) . . . The average connectivity is two trunks per node with a minimum of one (Oslo, Edinburgh, Dublin, San Jose, Boston, Warsaw) and a maximum of eleven (Paris). The object of the present invention is to reduce the number of links potentially explored in searching for the optimum path between a source and a destination node. In our example, the source is Los Angeles (USA) and the destination is Milano (Italy). The Phase 1 of the route determination procedure identifies four principal paths with a minimal hop count of three:

Los Angeles - London - Zurich - Milano
Los Angeles - London - Paris - Milano
Los Angeles - Raleigh - Nice - Milano
Los Angeles - New York - Paris - Milano Once Phase 1 is successfully achieved, Phase 2 is executed to determine an optimum path:

Accelerated Version

Figure 11:
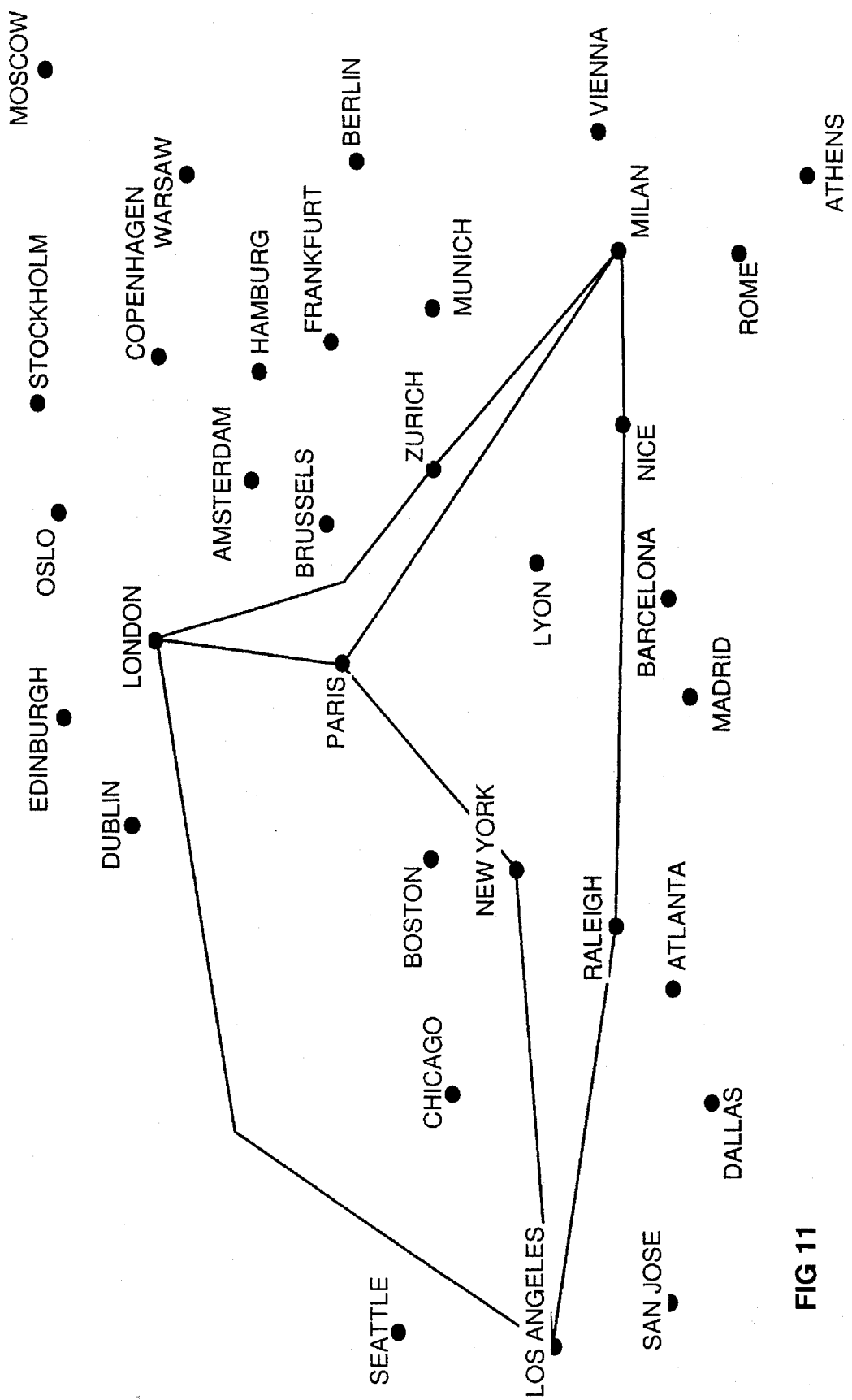
FIG. 11 illustrates the exploration of the network links for a path search between Los Angeles and Milano in an accelerated path search according to the present invention.

FIG. 11 shows the number of links explored by the Modified Bellman-Ford Algorithm in Routine A1 object of the present invention. Only the principal links are considered to determine the path length and feasibility. In our example, the network is reduced to 10 links: Los Angeles - London, Los Angeles - Raleigh, Los Angeles - New York, Raleigh - Nice, Nice - Milano, London - Zurich, London - Paris, Paris - Milano, Zurich - Milano, New York - Paris.

Conventional Version

Figure 12:
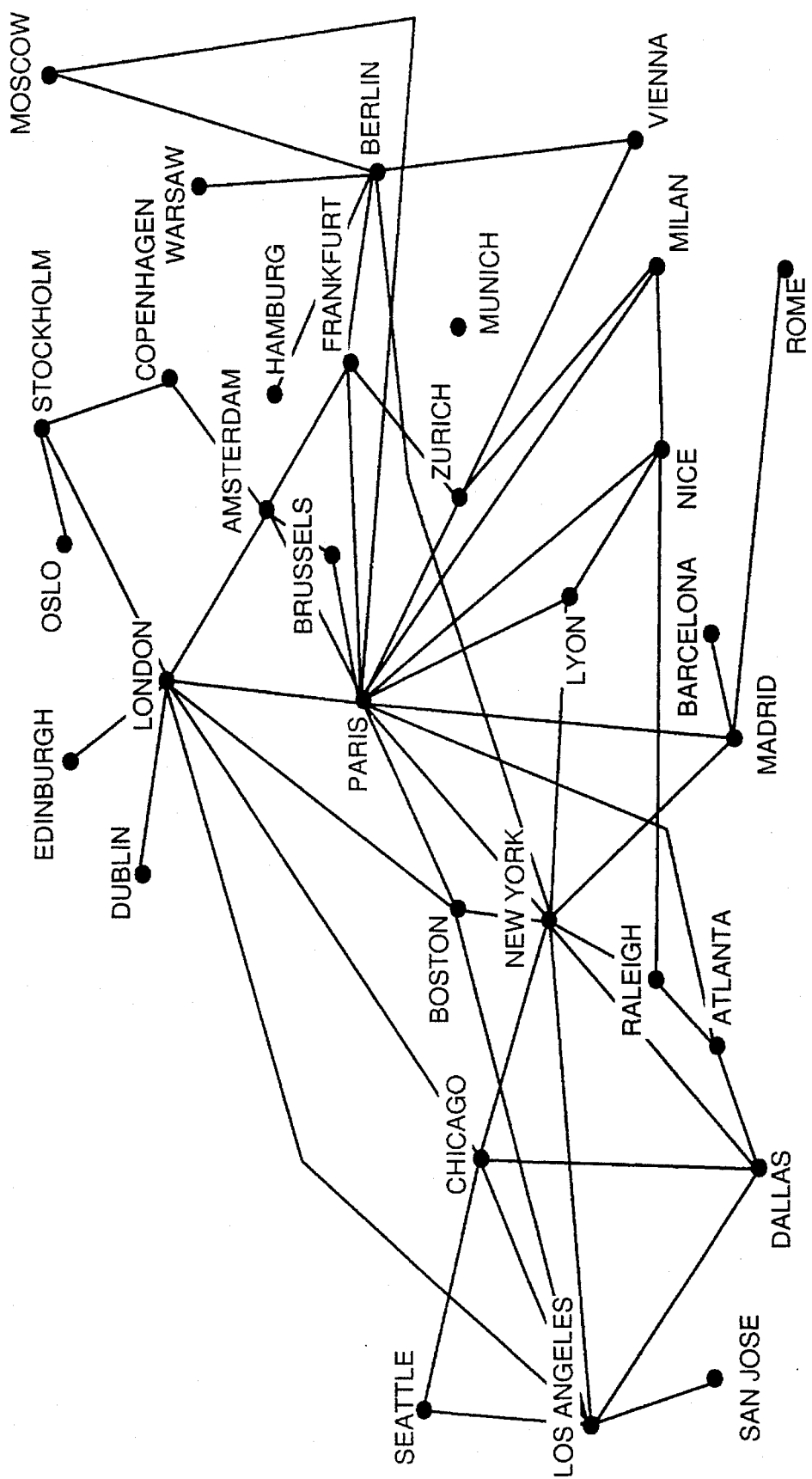
FIG. 12 illustrates the exploration of the network links for a path search between Los Angeles and Milano in a conventional path search according to the present invention.

FIG. 12 shows the number of links explored by the Modified Bellman-Ford Algorithm used in Routine A of the the conventional Phase 2 described in European Patent Application 93480030.1. The search is not only limited to principal links but includes also secondary links. For example, Moscow can be reached in three hops. The secondary links New York- Berlin and Berlin - Moscow are visited by the algorithm in its search for the optimum path. In our case, 54 links have been explored which represents 80% of the network.

Performances

To quantify the improvement resulting from the the new Path Selection procedure compared with the original version, a simulation has been done to estimate the performances of the path selection code running under a AIX Risc System/6000 workstation (compiled with XLC). An AIX tool providing, in output, the list of all instructions executed during the program and their usage frequency has been used.

The simulated network is the one described in FIG. 10. It comprises 33 nodes and 126 unidirectional links (63 trunks). Three tests have been run, first with the specifications detailed in European Patent Application 93480030.1 and secondly with the route determination procedure object of the present invention. The results of the computations are compared in the table hereunder: the gain of performance in term of executed instructions is about 15%.

|      |      | Visited links | Executed Instructions | |       |
| ---- | ---- | ------------- | ------------ | ----------- | ----- |
| Test | hops | in Phase 1    | Conventional | Accelerated | Gain  |
| 1    | 2    | 22            | 84.005       | 73.604      | 13%   |
| 2    | 3    | 54            | 189.331      | 156.955     | 17%   |
| 3    | 5    | 63            | 241.341      | 199.723     | 17%   |

The performance gain can reach 50% and more especially for longer paths and also when processors with rather poor computation capability are used, for example processors without Floating-Point capability.

Note:

These results take into account the two phases of the path selection procedure: Phase 1 remains unchanged and Phase 2 is updated in its new version according to the present invention.

The second pass having more floating point calculation compared with the first one, the gain would be larger with a hardware platform devoid of Floating Point Unit. For example, with a 960CF Intel processor (no Floating Point Unit), the gain is estimated to 50% for a average 4 hops path.

definitions

N is the total number of nodes in the network.

h is the iteration index of the algorithm, equal to the hop count.

$h^x$ is the hop count of the minimum hop path from the source node to the destination node satisfying the path length constraint ($h^x=0$ if the algorithm does not find a feasible path).

$h_k$ is the number of hops from the source node to node (k).

$P_T$ is the maximum Path Length Threshold between the origin (i) and the destination (j) nodes (maximum delay tolerated by the requesting connection).

$d_{kl}$ is the length (or delay) of the link (if any) between nodes (k) and (l). $d_{kl}=\infty$ if no link exists between node k and l, or if k=l.

$C_{kl}$ is the effective load (or bandwidth) capability of the link between node (k) and node (l) (Load Threshold)

$C_{kl,P}$ is the Load Threshold L(P) of the link (kl) as principal link in the route.

$C_{kl,S}$ is the Load Threshold L(S) of the link (kl) as secondary link in the route.

$\hat{C}_{kl}$ is the Total Allocated Load T(AL) for the link between modes (k) and (l) (total load which has already been allocated for this link due to previously calculated routes).

Current allocated load on link (kl):

$\hat{C}_{kl}^{(1)}$ is the allocated load not taking the requesting connection into account.

$\hat{C}_{kl}^{(2)}$ is the allocated load after the requesting connection.

D(l,h) is the smallest path length (delay) from the source node to the node (l) with exactly h hops ($=\infty$ if no such path exists).

What is claimed is:

1. A packet communications system comprising:
   a first plurality of packet switching nodes for receiving and sending data packets in the system;
   a second plurality of transmission links interconnecting pairs of said packet switching nodes; and
   means for determining an optimum path through said communications system between an originating node in said system and a destination node in said system, said means for determining an optimum path comprising
   means for identifying principal paths between said originating node and said destination node, said principal paths each including a minimal hop count wherein a hop is a single one of said transmission links in a principal path,
   means for identifying a set of principal links, a principal link being a link on a principal path identified by said principal path identifying means,
   means utilizing only the links in said set of principal links for determining an optimal path between said originating and destination nodes, and
   means for accepting said optimal path only if said optimal path also has a transmission delay below a preselected threshold.

2. A route controller for a packet communications system comprising packet switching nodes interconnected by transmission links comprising:
   means for identifying principal paths between an originating node and a destination node in said system, each said principal path including a minimal hop count where a hop is a single one of said transmission links in a principal path;
   means for identifying a set of principal links, a principal link being a link on a principal path identified by said identifying means,
   means utilizing only the links in said set of principal links for determining an optimal path between said originating and destination nodes, and
   means for accepting said optimal path only if said optimal path also has a transmission delay below a preselected threshold.

3. A method for determining paths in a packet communications system comprising the steps of:
   interconnecting a first plurality of packet switching nodes for receiving and sending data packets in said system through a second plurality of transmission links;
   identifying principal paths between an originating node and a destination node in said system, each said principal path including a minimal hop count where a hop is a single one of said transmission links in a principal path;
   identifying a set of principal links, a principal link being a link on an identified principal path,
   determining an optimal path between said originating node and said destination nodes means utilizing only the links in said set of principal links, and
   accepting said optimal path only if said optimal path also has a transmission delay below a preselected threshold.

4. For use in a packet communications system comprising a plurality of packet switching nodes interconnected by a plurality of transmission links, a method of determining an optimal path between an originating node and a destination node, said method comprising the steps of:
   identifying principal paths between the originating node and the destination node in said system, each said principal path including a minimal hop count where a hop is a single one of said transmission links in said principal path;
   identifying a set of principal links, a principal link being a link on an identified principal path,
   determining an optimal path between said originating node and said destination node utilizing only the links in said set of principal links, and
   accepting said optimal path only if said optimal path also has a transmission delay below a preselected threshold.

* * * * *